United States Patent [19]

Brown et al.

[11] Patent Number: 4,553,183

[45] Date of Patent: * Nov. 12, 1985

[54] MEMORY STORAGE APPARATUS HAVING IMPROVED HOUSING AND BASE PLATE ARRANGEMENT

[75] Inventors: Stanley F. Brown, Cupertino; Garold W. Plonczak, Santa Clara, both of Calif.

[73] Assignee: Atasi Corporation, San Jose, Calif.

[*] Notice: The portion of the term of this patent subsequent to Nov. 1, 2002 has been disclaimed.

[21] Appl. No.: 392,505

[22] Filed: Jun. 28, 1982

[51] Int. Cl.⁴ .................... G11B 23/02; G11B 17/26
[52] U.S. Cl. .................................... 360/98; 360/97
[58] Field of Search ................ 360/97, 98, 99, 86, 360/133; 206/309, 444

[56] References Cited

U.S. PATENT DOCUMENTS

| | | | |
|---|---|---|---|
| 4,054,931 | 10/1977 | Bolton et al. | 360/97 |
| 4,280,155 | 7/1981 | Scott et al. | 360/98 |
| 4,282,554 | 8/1981 | Ho et al. | 360/97 |
| 4,315,288 | 2/1982 | Bernett et al. | 360/98 |
| 4,367,502 | 1/1983 | Iftikar et al. | 360/98 |
| 4,367,503 | 1/1983 | Treseder | 360/98 |
| 4,414,594 | 11/1983 | Farmer | 360/106 |
| 4,429,336 | 1/1984 | Berube et al. | 360/97 |
| 4,489,356 | 12/1984 | Farmer | 360/97 |
| 4,491,888 | 1/1985 | Brown et al. | 360/97 |

Primary Examiner—John H. Wolff
Assistant Examiner—David J. Severin
Attorney, Agent, or Firm—Thomas S. MacDonald; Alan H. MacPherson; Steven F. Caserza

[57] ABSTRACT

A fixed disc drive type of memory storage devices includes an annular elastomeric pad that is engaged between the actuator base plate and a bowl-shaped lower casing. The pad is concentric with the spindle axis and forms an air-tight seal at the edge of a circular opening in the lower casing that prevents dust from entering the housing. The base plate has a circular platform portion with the hub for the spindle shaft being formed at its center. The circular form of the opening and platform portion are such that any temperature differential across the lower housing induces an oil-scanning type of deformation in the base plate so that the spindle does not tilt relative to the plane of motion of the transducers.

15 Claims, 5 Drawing Figures

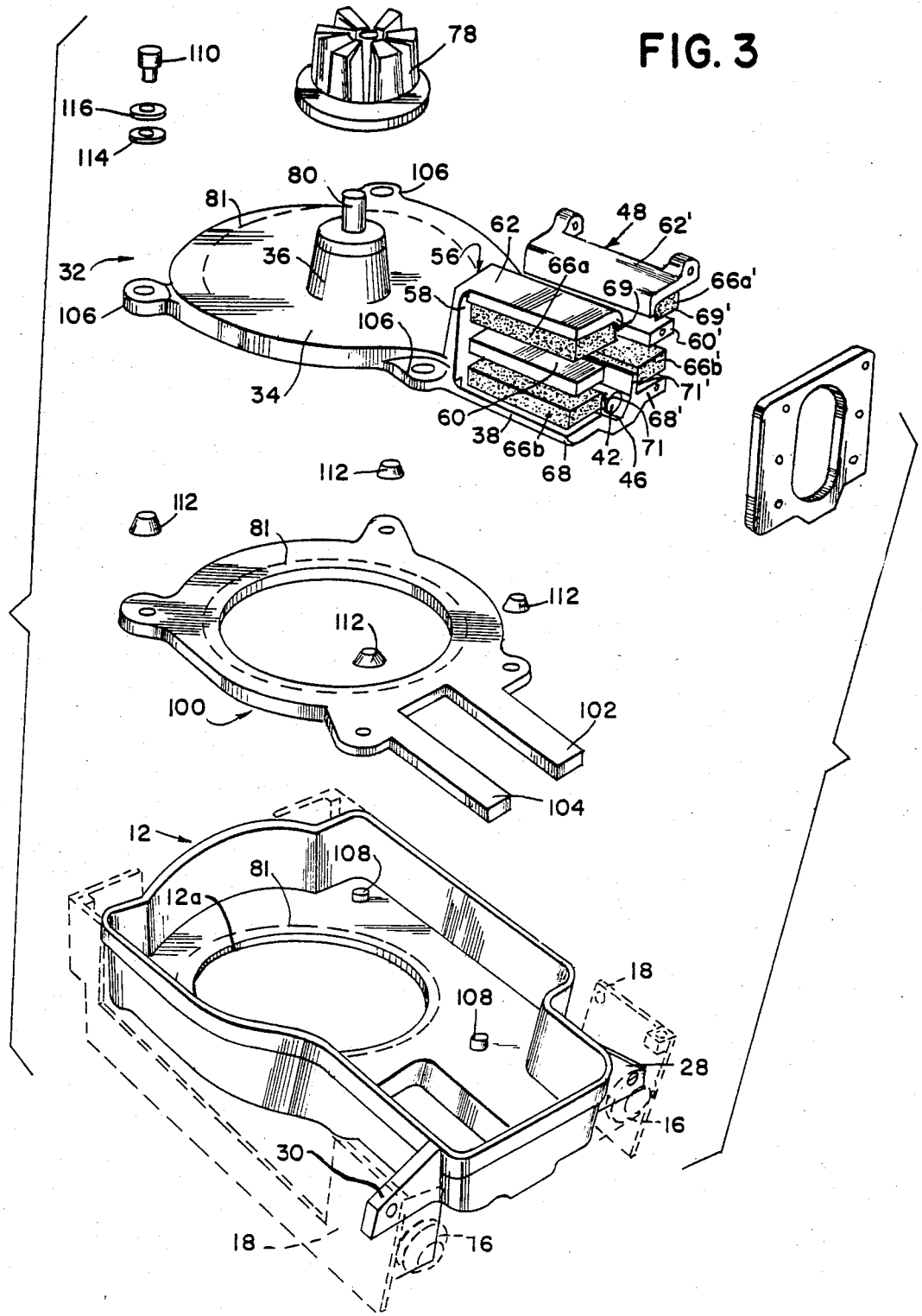

MEMORY STORAGE APPARATUS HAVING IMPROVED HOUSING AND BASE PLATE ARRANGEMENT

BACKGROUND OF THE INVENTION

The present invention generally relates to memory storage devices of the type that include one or more rotating discs. More particularly, the present invention concerns rotating disc memory storage devices that include a housing that provides a dust-free environment for the rotating disc or discs.

U.S. Pat. Nos. 4,280,155 and 4,282,554 are illustrative of that type of rotating disc memory storage apparatus known as fixed disc drives. As shown in the '554 patent, a fixed disc drive typically includes a housing made of two generally bowl-shaped casings that are fastened together to form an air-tight seal therebetween so that the discs are isolated from the ambient environment. Such air-tight seal is desirable because the presence of dust or other air-borne contaminants on the active portions of the discs will introduce noise into read-out therefrom and will also induce rapid wear of the transducers and disc surfaces. It is also noted that the motor of the disc drive devices include air-tight bearing seals to further reduce the possibility of dust contamination, and also a filter is incorporated in the internal ventilation or cooling system of the device (as illustrated in U.S. Pat. No. 4,282,554) to remove any contaminants from air recirculated within the housing.

The aforementioned U.S. Pat. No. 4,280,155 discloses a fixed disc drive that includes a flat rectangular base plate made of aluminum and a bowl-shaped cover made of plastic. A magnetic transducer head carriage and positioning assembly (referred to hereinafter as a transducer actuator assembly) is mounted to the base plate adjacent the periphery of the discs, with the transducers being mounted upon flexure arms that project outwardly form the actuator assembly. The motor for rotating the discs is mounted above the base plate within the housing.

A major shortcoming of prior known art memory storage devices relates to tilt of the axis of rotation of the discs relative to the path of movement of the transducers as a result of temperature distortions in the housing or base plate upon which the actuator assembly is mounted. Referring, for illustrative purposes, to the aforementioned U.S Pat. No. 4,280,155, it will be seen that the uppermost flexure arm and associated transducer is spaced about twice as far from the base plate as the lowermost flexure arm and transducer. If heat is unevenly distributed across the base plate, as may be produced by the internally mounted motor, the base plate will tend to distort as a result of such heat so that the spindle axis tilts relative to the actuator assembly. If any "tilt" is so induced, the uppermost transducers will be shifted from the desired track location on the uppermost disc. It is noted that even a minute amount of such radial shifting is unacceptable in a fixed disc drive intended for very high track density.

SUMMARY

The present invention provides a rotating disc memory storage apparatus having an improved base plate and housing arrangement adapted to solve the aforementioned problem.

In accordance with the invention, the housing of the memory storage apparatus includes two casings that are removably attached to each other to form a generally air-tight enclosure. One of the casings has a wall portion in which a circular opening is formed. The apparatus further includes a base plate having a generally flat, annular platform portion and another portion projecting from the periphery of the platform portion to which the actuator assembly is mounted. The spindle for rotatably mounting the discs is perpendicularly disposed at the center of the circular platform portion of the base plate. The base plate is mounted to the housing so that the spindle is centered within the aforesaid circular opening, and an annular elastomeric member is provided for forming an air-tight seal between the housing and the base plate.

Due to the annular shape of that portion of the base plate to which the spindle is mounted, a temperature differential between the interior and exterior surfaces of the base plate in the vicinity of the spindle will cause the plate to distort in an "oil-canning" manner such that the spindle axis will remain normal to the plane of the base plate; particularly, the spindle axis will remain perpendicular to the plane of the actuator portion of the base plate even if the base plate buckles somewhat in response to a temperature differential across the base plate. This type of temperature distortion of the base plate will accordingly not result in any substantial "tilting" action as described before in connection with the known prior art rotating disc memory storage apparatus.

Due to the thermal insulation properties of the elastomeric member and the lack of any direct conductive connection between the base plate and the outside housing, heating or cooling of the base plate can only occur by convective heat transfer through the circulated air within the unit. This uniform air bath heat transfer assures that the base plate assembly is maintained at a substantially uniform temperature throughout (even when its temperature is changing).

BRIEF DESCRIPTION OF THE DRAWINGS

FIG. 3 is an exploded isometric view showing the form of the elastomeric pad and the attachment of the base plate to the lower casing of the housing.

DESCRIPTION OF A PREFERRED EMBODIMENT

Figure 1:
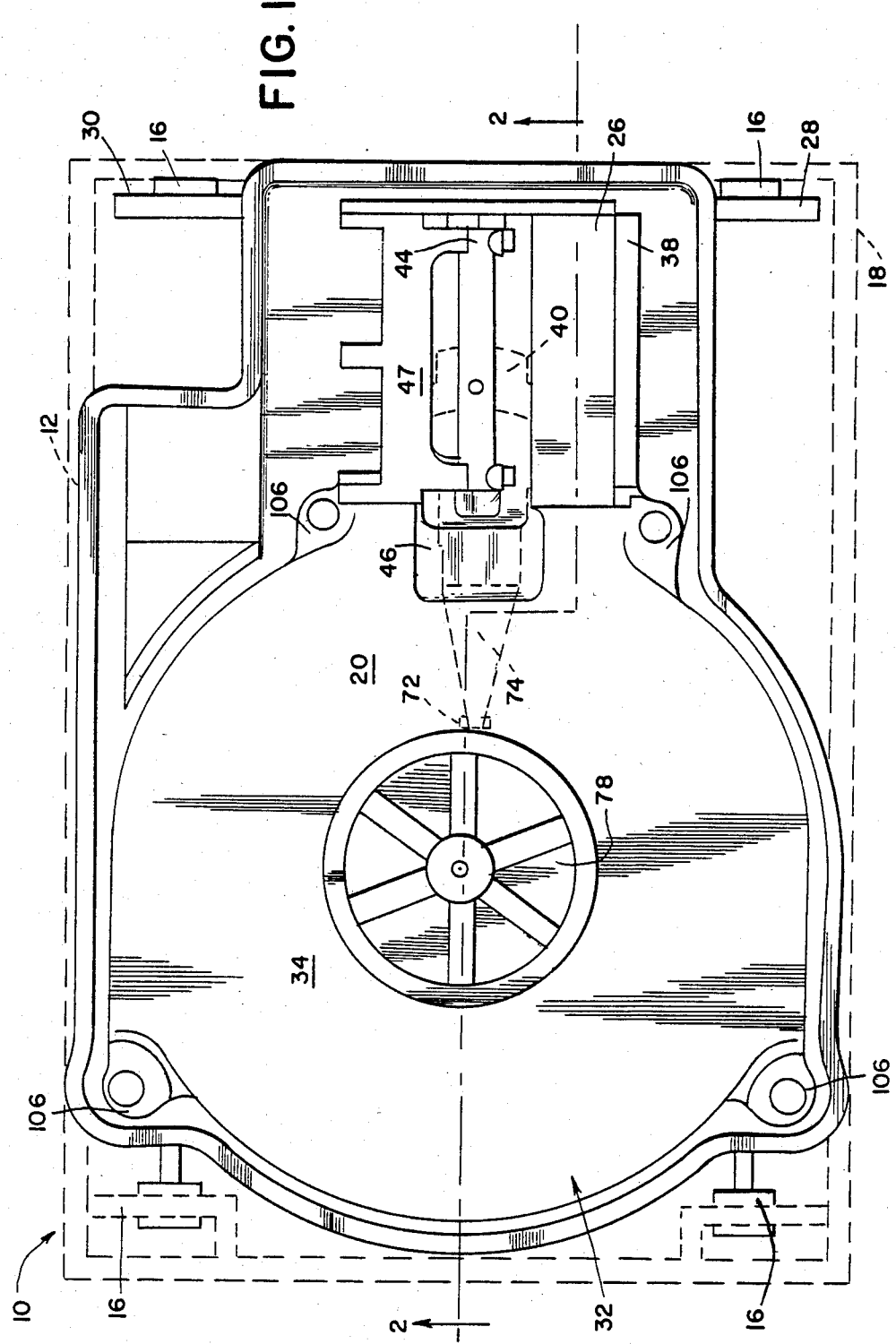
FIG. 1 is a top plan view of a preferred embodiment of the improved rotating disc memory storage device of the present invention, with the discs and the associated disc clamp being removed to better illustrate the form of base plate, and with the actuator assembly and chassis being illustrated in phantom outline.
Figure 2:
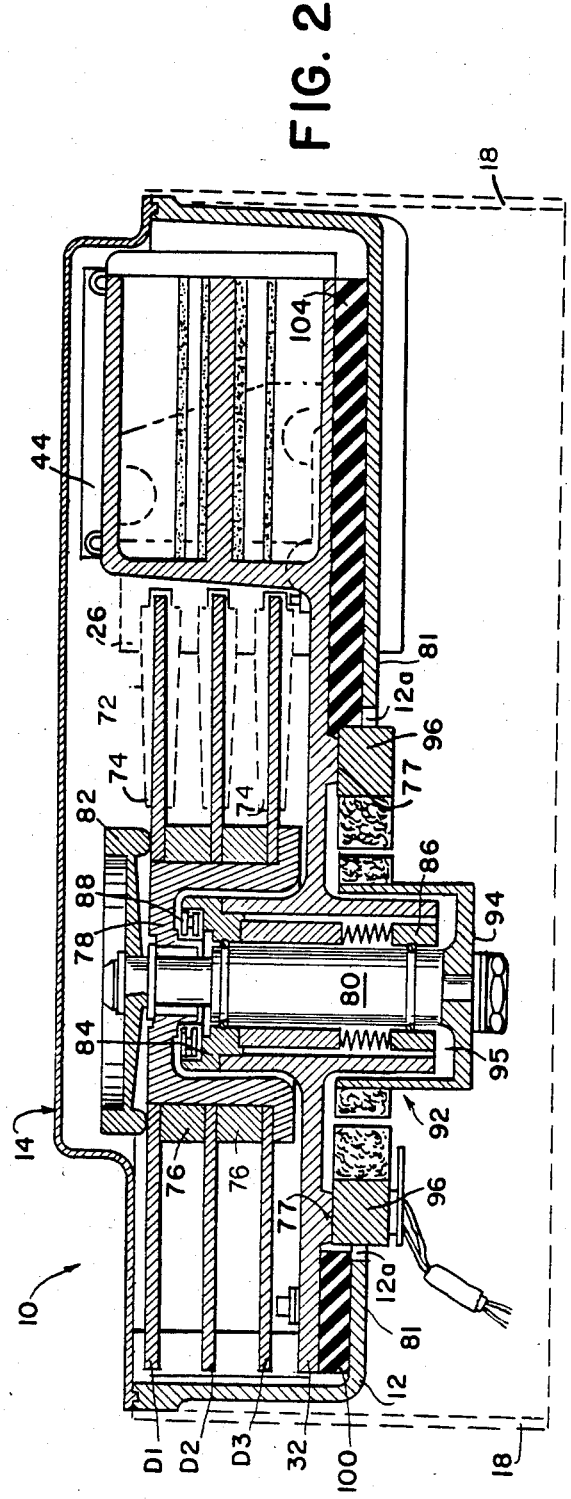
FIG. 2 is a section taken generally as shown by line 2—2 in FIG. 1, with the discs and disc clamp being included, and with the actuator assembly and chassis again being shown in phantom outline.
Figure 5:
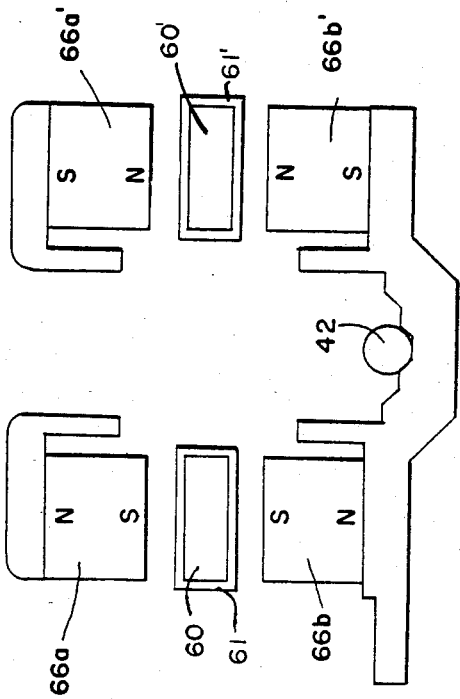
FIG. 5 shows the relative orientation of the magnets in the actuator assembly.

Referring now more particularly to FIGS. 1–3, a preferred embodiment of the disc drive memory storage apparatus 10 of the present invention includes a housing comprised of lower casing 12 and an upper casing 14 (the lower casing may also be referred to as the "bowl" and the upper casing as the "cover"). As shown in FIGS. 1, 2 and 3, lower casing 12 is horizontally mounted to the chassis 18. The housing may be vertically oriented on its sides so long as the actuator assembly moves only in a horizontal direction, and it therefore should be recognized that the terms, upper and lower (or right and left) as used herein are not meant to be limiting. Generally, and as in the aforementioned prior art fixed disc drives, the housing provides a sealed environment for the magnetic discs so that the active areas of the discs will be free from dust or other contaminants that could otherwise affect the information stored on the discs and cause undue wear of the discs and transducers.

Casings 12 and 14 are fabricated from aluminum or other material that conducts heat rapidly, thus enabling the casings to act as heat-sinks. In this connection, an air circulation and filtration system as described in copending application Ser. No. 06/391,782, filed June 24, 1982, U.S. Pat. No. 4,489,356 on an invention of Paul L. Farmer entitled "Enclosed Disk Drive with Improved Air Filtration System" and assigned to Atasi Corporation, the assignee of this application, is provided within the housing for continuously circulating air over the interior surfaces of the casings to allow the air to be cooled by dissipation of the heat through the casing walls. This copending application is hereby incorporated by reference.

Lower casing 12 is mounted by Lord-type shock mounts 16 (phantom outline in FIG. 3) to chassis 18. The shock mounts 16 are of standard construction incorporating rubber diaphragms adapted to isolate the memory storage apparatus from lower frequency vibrations (shocks) transmitted into the chassis 18. As best seen in the top plan view of FIG. 1, the casings are contoured to the shape of the magnetic discs. Thus, the casings include rounded wall portions adjacent the discs, and in the vicinity of the actuator assembly 26, the casings are narrower. Flanges 28 and 30 are integrally formed at the actuator end of the lower casing, to which the shock-isolating mounts 16 are attached. Two further mounts (shown in phantom form in FIG. 1) are attached to the other end of the lower casing 12 adjacent the other two corners. It will be observed in FIG. 3 that the mounts are attached to upright surfaces of the casing 12 so that the axes of the rubber diaphragms of the mounts are parallel to the linear direction of travel of the reciprocating carriage 40 (FIG. 4) of the actuator assembly. This orientation enables the mounts 16 to absorb those external shocks that would be most apt to jar the transducers 74 off the desired track locations on the discs. Mounts 16 also isolate the structure to which the disc drive is attached from vibrations generated internally in the disc drive primarily by the reciprocating motion of the actuator assembly 26.

Memory storage apparatus 10 further comprises as shown in FIG. 3 a base plate 32 to which the magnetic discs D1, D2, and D3 and the actuator assembly 26 are operatively connected. Base plate 32 is integrally formed from a rigid, relatively heavy material. Preferably, steel is used because it has a relatively high first natural frequency of vibration thereby increasing the mechanical bandwidth of the structure. Moreover, steel is preferred due to the novel integral formation, within the base plate, of the pole members (magnet support structures) and shield members of the actuator assembly, as described hereinafter. The base plate includes a generally annular, flat platform portion 34 having a boss or hub 36 with a through bore precision formed at the center thereof. An actuator portion 38 projects outwardly from the periphery of the platform portion, Thus, the base plate will be seen to have a shape in top plan generally resembling a ping-pong paddle.

The use of an integrally formed base plate combining the boss and spindle bore with the support for the actuator assembly and the magnetic pole members and shielding results in several significant advantages over the prior art. Assembly costs are reduced by eliminating the tight tolerances required in the prior art on the components to be assembled to ensure that the final structure was within tolerances. Fasteners and adjustments are eliminated with commensurate cost savings and improvement in reliability and quality. The base plate is mounted in the housing in a manner which mechanically and thermally substantially decouples the base plate and actuator assembly from the housing and external environment. By using a low carbon steel (in one embodiment ductile iron which resists oxidation is used) or other magnetically soft steel, the base plate also serves as a magnetic shield to prevent stray flux from the disc motor and the transducer actuating assembly from entering the disc area and erasing or degrading data. Use of a single integral base plate allows all mechanical components in the disc drive to be easily assembled, tested, removed and replaced. This makes initial manufacture and servicing easy. To minimize magnetic flux escaping from the pole pieces into the disc area, sharp edges on the base plate are avoided. Any such edges are deliberately rounded as necessary to yield the required low magnetic flux. The actual amount of rounding required was determined experimentally and ranged typically from 1/16" radius to $\frac{1}{2}$" radius.

Details of construction of actuator assembly 26 and the actuator portion 38 of base plate 32 are disclosed in the co-pending U.S. Pat. application Ser. No. 06/352,943 filed Feb. 26, 1982, now U.S. Pat. No. 4,414,594 and the disclosure of this co-pending U.S. patent application is incorporated hereby by reference. Actuator assembly 26 is generally comprised of a carriage 40 and a pair of electromagnetic motors that exert transversely spaced, symmetrically disposed motive forces upon the carriage. The carriage is supported for reciprocating movement between lower and upper cylindrical guide rods, 42 and 44 respectively. Lower rod 42 (with its end facing the spindle being rounded to prevent flux leakage) is secured to the base plate within a longitudinal recess 48 (FIG. 3,), which recess is formed so that the axis of the rod 42 is normal to the spindle axis and so that the rod 42 extends generally radially to the axis of spindle 80 but is slightly offset to one side of the spindle axis (FIG. 1). Upper rod 44 is mounted to support member 47 that is, in turn, pivotally attached to the right magnet support structure 48. The upper guide rod support member 47 pivots about an axis that is parallel to and laterally offset from the lower rod so that the core of the transducer follows a radius of the disc during "seek". The upper rod 44 is overhead and parallel to the lower rod 42.

The carriage 40 of the actuator assembly 26 includes a central body portion and coil support wings 70a and 70b extending symmetrically at the side of the central body portion. A single pair of rollers 50 is mounted to the top of the carriage body, and two longitudinally spaced pairs of rollers 51 (one shown in FIG. 4) are mounted to the lower end carriage body. The rollers ride against the upper and lower guide rods 42 and 44

Figure 4:
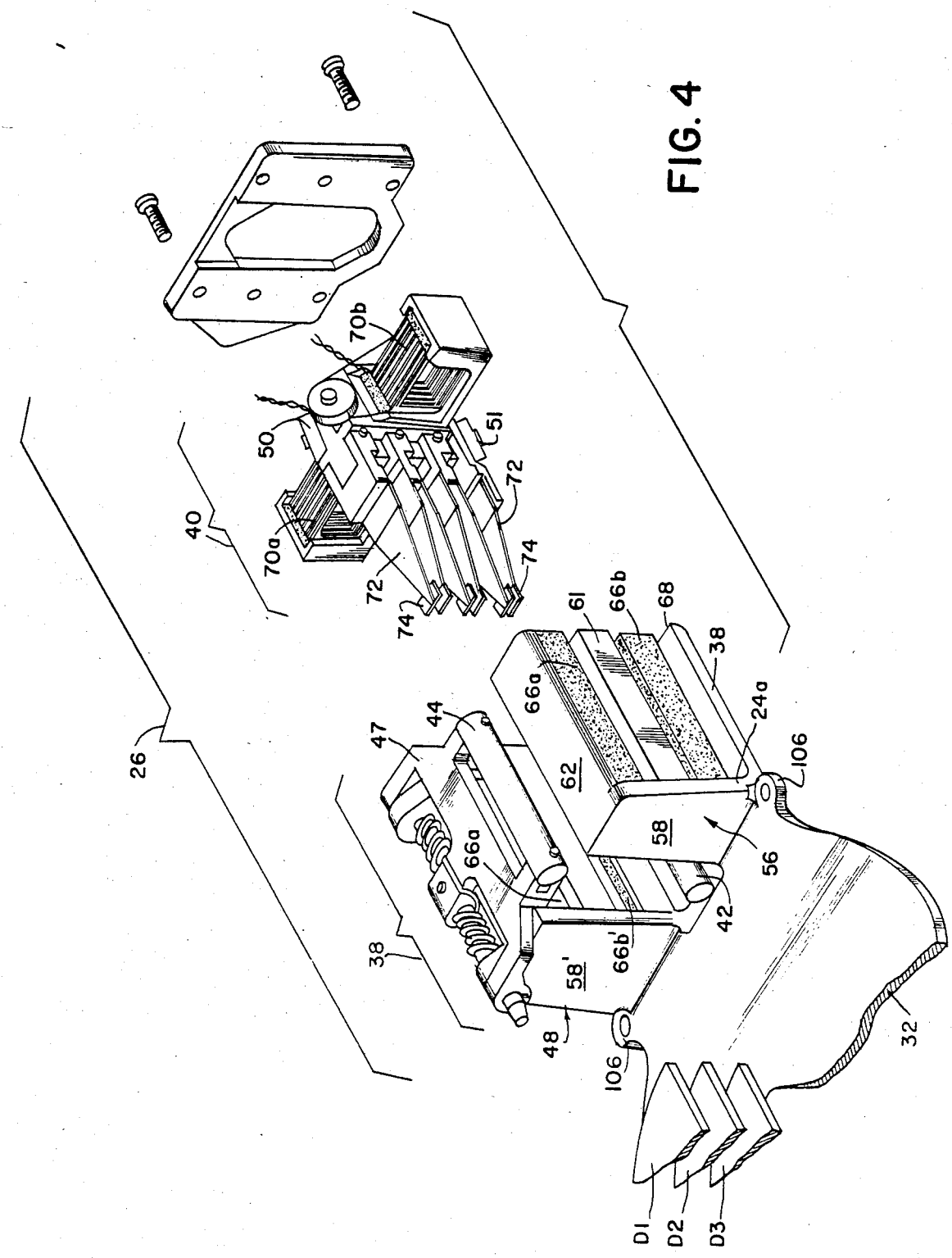
FIG. 4 is an exploded isometric view which depicts the construction of the actuator assembly and its relationship to the base plate.

(FIG. 4). The upper guide rod 44 is downwardly biased, or preloaded, by a torsion spring to firmly engage the carriage rollers 50 and 51 between the guide rods 42 and 44.

The actuator portion 38 of the base plate includes integrally formed as a part thereof symmetrically disposed magnet support structures 48 and 56 (FIG. 3). These structures, although not identical, function as mirror images of each other about a plane through the axis of lower guide rod 42. Each includes a flat upright post (58' and 58) at its front end that is adjacent, the discs D1-D3, a center post 60, 60' and an upper post 62, 62' extending perpendicularly from the front post. Two pairs of rectilinear or slab-shaped magnets are affixed to the support structures. Lower magnets 66b and 66b' are mounted upon lands 68 and 68' that are separated from the recess for the lower guide rod 42 by vertical flux shields 69, 69' and 71, 71', and upper magnets 66a and 66a' are affixed to the lower surface of the respective upper posts 62 and 62'. Copper sleeves 61 (FIG. 4) encase the center posts to form shorted turns. Air gaps are formed between the shorted turns and the respective upper and lower magnets.

Coils 70a and 70b (FIG. 4) are symmetrically mounted to the wings of the carriage 40. The coils have hollow rectangular configurations for registration within the respective air gaps. That is, the coils have rectangular cross-sections including flat upper sections adapted to register within the upper air gaps between poles 60, 60' and magnets 66a, 66a' and flat lower sections adapted to register within the lower air gaps between poles 60, 60' and magnets 66b, 66b'. The leads of coils 70a, 70b are operatively connected to an actuator drive circuit (not shown). When energized, the dual motor actuator generates a high force adapted to rapidly position the transducers 74 relative to the discs D1, D2, D3.

It will be seen in FIG. 2 that transducers 74 are mounted upon flexure arms 72. The memory storage apparatus includes three discs D1-D3, each having active surfaces on both sides. Thus, six flexure arms 72 and transducers 74 are arranged upon the leading end of the central body portion of the carriage 40 so that the six transducers 74 are precisely oriented relative to the discs D1, D2, D3.

The discs D1-D3 spaced by sleeves 76 (FIG. 2) are received upon a cup-shaped member or spindle hub 78 mounted on spindle shaft 80 in hub 36; the spindle hub 78 has a flange at its lower end for precisely mounting the discs. Spindle hub 78 is, in turn, secured upon spindle shaft 80. The discs and sleeves are secured upon spindle hub by a so-called disc clamp 82 (FIG. 2) having a thin resilient diaphragm portion and a heavier rim portion adapted to firmly engage the disc assembly to secure it tightly upon spindle hub 78. The clamp is removably engaged to the upper end of the spindle shaft 80 by a screw that is received in a bore formed in the upper end of the spindle shaft.

The bearing arrangement for rotatively mounting the spindle shaft 80 within the hub portion 36 of the base plate 32, as shown in FIG. 2, includes an upper bearing 84 and a lower bearing 86. A ferro-fluidic seal assembly 88 is mounted within the outer race of the upper bearing adjacent the upper end of the spindle hub 78. The outer race of the upper bearing 84 has a recessed upper end for receiving the ferro-fluidic seal assembly 88. This latter assembly includes axially spaced annular magnets and a magnetically permeable fluid within the space between the magnets. The magnetic fluid magnetically adheres to the spindle to form a seal therewith that is effective at high motor speeds of, for example, 3600 RPM. The upper race has a shoulder formed thereon for mounting within the upper end of the base plate hub 36, and the outer race of the lower bearing is engaged within the bore of the hub adjacent its lower end. The upper outer race is secured by an adhesive material to the bore portion of the base plate.

The rotor 94 of a high speed, precision motor 92 is affixed to the lower end of the spindle, and the stator 96 thereof is attached, by means of a well known thermally insulating mounting structure, to bosses 77 formed on the outer or lower surface of the base plate 32. Rotor 94 includes a cup-shaped member 95 to which the annular rotor magnets are mounted, with the cup-shaped member 95 being affixed at its center to the lower end of the spindle shaft 80 and the annular walls thereof concentrically enveloping the lower end of the hub. By securing the stator to the base plate 32 (rather than, in converse manner, to the spindle shaft), heat generated in the stator coils is distributed into the base plate 32 at areas that are substantially spaced from the hub. It is also noted that the mounting bosses 77 for the stator are symmetrically disposed (at the same radius) from the spindle axis.

According to an important aspect of the present invention, the base plate platform portion 34 is ping pong paddle shaped with the portion of base plate 34 surrounding hub 36 and within dashed line 81 being annularly symmetrical.

By "portion of base plate 34 surrounding hub 36" which is "annularly symmetrical" is meant that portion of the base plate material 34 which is shown within the dashed line 81 in FIG. 3. Note that dashed line 81 is drawn around the inner bottom surface of lower casing 12 (FIG. 3) around elastomeric material 100 and on base plate 34. In looking at base plate 34 in FIG. 3, during steady state operation, a thermal symmetry exists annularly in the material of base plate 34 within dashed line 81. Even though the temperature on the top surface of base plate 34 will generally be different from the temperature of the bottom portion of base plate 34, the annular symmetry of the material and of the temperature distribution causes spindle 80 and hub 36 to deflect upward or downward depending upon the temperature gradients in a direction perpendicular to the motion of the actuating mechanism 26. Consequently, the distortion due to thermal gradients in the base plate 34 is translated into motion of the discs and spindle perpendicular to the direction of motion of actuating mechanism 26 rather than into an angular displacement or tilt. Although it is possible to have energy sources which are localized relative to the annular portion of base plate 34, the rotation of the discs within casing 12 results in an air flow which distributes the heat relatively uniformly within the casing and thereby assures that at least the top portion of base plate 34 within the dashed line 81 has a substantially uniform temperature. Similarly, the motion of rotor 94 of motor 92 causes the air around the bottom of the annular portion of the base plate 34 to similarly distribute any localized heat around the base plate. Accordingly, the temperature of the base plate in the structure of this invention remains substantially annularly symmetrical even though localized hot spots may exist in the electronics beneath the base plate. This annular symmetry is turned to advantage in accordance with this invention to overcome the tilt of shaft 80 in the prior art disc drive base plates. Even though the temperature of the base plate 34 changes during operation of the disc drive due to heat generated by the electronics associated with the disc drive and due to external sources, shaft 80 moves perpendicular to the motion of carriage 40.

During steady state operation when the temperature of the base plate has become uniform, the shaft 80 is merely displaced vertically and not tilted. When the disc drive operating conditions are changed, a temperature transient will often appear in the base plate. However, shaft 80 will still only be displaced vertically and will not tilt. In the prior art, a temperature gradient, even if transitory, will result in possible inoperativeness of the disc drive as a result of heads moving off track and being unable to either store or recover data. Consequently, the structure of this invention has overcome a material disadvantage of prior art disc drives in a novel and advantageous manner.

In accordance with this invention, the lower casing 12 of the housing has a circular opening 12a formed therein (FIG. 3) that is concentric with the circular edge 81 of the annularly symmetrical platform portion within dashed line 81. An annular elastomeric member or pad 100 is engaged between the base plate and lower casing adjacent the periphery of the platform portion to thus encircle the opening 12a. As may be best seen in FIG. 2, the circular opening 12a in the casing 12 is larger than the outer diameter of the stator 96 to enable the base plate with the other parts assembled thereon to be easily removed from the housing. The annular pad 100, as best seen in FIG. 3, also includes two straight portions 102 and 104 integrally formed therewith which extend under the magnet supports 68 and 68' of the actuator portion of the base plate 32. It will be appreciated that these straight extensions 102, 104 of the pad need not be integrally formed with the annular portion. Such straight extensions are provided to assist in dampening actuator-induced vibrations, as shall be described hereinafter. The outer perimeter of the pad generally follows the outer perimeter of the base plate 32, and its inner diameter generally equals the diameter of opening 12a in the casing 12. The area of the base plate 34 immediately surrounding the hub 36 that is exposed to the exterior environment—and to the heat generated by the motor—is annular.

The effect of the annular shape of that portion of base plate 32 within line 81 shall now be explained. Assume that the heat generated by the motor 92 is so substantial that the temperature of the lower surface of the platform portion 34 of base plate 32 becomes higher than the temperature of the interior surface of the platform portion. Since the area of exposure is symmetrical about the axis of rotation of the spindle, this temperature differential tends to induce within the annular area of exposure an "oil-canning" effect such that the annular surface will tend to bulge or buckle at its center to slightly depress the hub. This type of deformation is thus so controlled by the annular shape of the area of exposure that the spindle shaft 80 will remain perpendicular to the direction of linear movement of the actuator assembly. This sort of deformation is tolerable in that the discs D1–D3 will not tend to tilt off-axis and thus lean relative to the planes of movement of the transducers 74. Thus, the possibility that the information stored on the surfaces of the upper discs will not be properly accessed due to tilting (especially in the uppermost disc D1) is minimized.

The configuration of the base plate 32 of this invention and particularly the annular symmetry of the base plate within dashed lines 81 ensures that the number of tracks per inch capable of being implemented using the principles of this invention is substantially greater than the number of tracks per inch capable of being achieved on the disc surfaces of the prior art disc drives.

The elastomeric member or pad 100 is relatively thick and soft and is firmly engaged against the base plate 32 so that it dampens vibrations in the base plate 32 induced by the rapid reciprocation of the actuator carriage 40. In the preferred embodiment, the pad is cut from a ¼ inch thick, flat sheet of foam-type rubber sold under the trademark, ISO-DAMP by the E.A.R. Corporation. This type of rubber is suitable due to its superior vibration dampening characteristics, while it also has excellent temperature insulation properties. By the means to be explained hereinafter, the pad 100 is normally engaged in a slightly compressed state so that it has a large annular area in firm intimate contact with the base plate 32. This intimacy of contact not only assures a high level of dampening of actuator-induced, relatively high-frequency vibrations, but also assures that a high-integrity air-tight seal is formed around the opening 12a in the lower casing, thus preventing dust or other air-borne contaminants from entering the disc drive housing.

The means for engaging the annular elastomeric pad 100 in firm intimate contact with the base plate 32 is illustrated by exploded view in FIG. 3. The base plate has four lugs 106 projecting at spaced locations from the periphery of the circular platform portion 34. These lugs have bores formed therethrough which are conically shaped at their lower ends. The lower casing 12 has four studpins 108 mounted thereto, with threaded bores being formed in their upper ends. The studpins are disposed to receive screws 110 for removably attaching the base plate 32 to the lower casing 12. The studs project above the flat floor of the lower casing 12 each by a distance that is greater than the thickness of the elastomeric pad 100. When the screws are tightened down, the pad 100 will be substantially compressed between the base plate 32 and the floor of the lower casing 12. It will be seen in FIG. 3 that the pad 100 has ears contoured to match the shape of the lugs 106. Thus, the elastomeric pad is contoured so that it is held in contact with the entire surface area of the base plate 32 excluding those areas above opening 12a and between lands 68 and 68'.

To absorb lower frequency vibrations, such as may be transmitted to the casing by minor impacts to chassis 18, frusto-conical elastomeric washers 112 are mounted between the studs 108 and base plate 32 in engagement within the tapered bores in the four base plate lugs 106. Also, flat elastomeric washers 114 are also positioned between the base plate lugs 106 and metal washers 116 engaged under the heads of the screws 110. The rubber washers 112 and 114 are sufficiently soft to provide some resiliency in the attachment of the base plate to the lower casing to further isolate the base plate from those relatively low-magnitude, low-frequency vibrations that are not completely isolated by the aforedescribed Lord-type resilient mounts 16.

As shown in FIGS. 2 and 3 and mentioned briefly above, two straight or rectangular portions 102 and 104 are integrally formed with the annular pad 100 to extend at locations aligned with the magnet support structures 68 and 68' of the actuator portion 38 of the base plate 32. These extensions are also compressed between the plate 32 and floor of the casing 12. They provide additional dampening contact with the base plate 32 so that no portion of the base plate 32 is cantilevered or unsupported in a manner that permits plate 32 to act as a freely suspended beam. This contact of the pad 100 with the plate 32 from its actuator end to the end thereof distal from the actuator effectively dampens first natural frequency, resonant vibrations that may otherwise be induced in the base plate 32 by the rapid reciprocation of the carriage 40 of the actuator assembly 36.

As a feature of this invention, the base plate 34 is fabricated of steel preferably nickel plated for corrosion protection. Surprisingly, base plate 34 has formed as an integral part thereof, the magnetic structure associated with the actuator mechanism. In FIG. 4, actuator mechanism 26 includes two end support plates 58 and 58' generally perpendicular to the portion of the base plate 34 underneath the discs. These end plates 58 and 58' each support three pole pieces such as pole pieces 62, 60 and 68 supported by end plate 58 and three other poles 62', 60' and 68' supported by end plate 58'. Surprisingly, contrary to expectations, the use of one integral steel piece for both base plate 34 and the magnetic pole structure did not lead to a substantial increase in magnetic flux in the disc area. It is critical in a disc drive that the magnetic field in the area of the rotating discs be less than some maximum value to prevent the erasure of the information stored on the discs. Typically, this feature is five (5.0) gauss maximum. In accordance with this invention, it has been discovered that the use of an integral steel piece for both the base plate 34 underneath the disc assembly and the magnetic pole structure is possible by carefully configuring the end plates 58 and 48 (FIG. 4) to direct and contain the magnetic field lines from the magnets 64a, 64b, 66a and 66b. In addition, as illustrated in FIG. 3, to prevent additional flux from being forced into the areas occupied by the rotating discs, magnets 66a and 66b are reversed in polarity from the polarities of magnets 66a' and 66b'. Magnet 66a in FIG. 3 is oriented such that the magnetic field lines flow directly across from magnet 66a' to 66a and from 66b' to 66b.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed is:

1. A rotating disc memory storage apparatus comprising:
   an apparatus housing including a top cover, surrounding side walls and a bottom housing wall portion;
   said bottom housing wall portion having a circular opening therein;
   an electric motor including a stator and rotor;
   a spindle shaft operatively connected to the motor;
   a base plate within said housing and including an annular platform portion having hub means at its center for receiving said spindle shaft so that the spindle shaft may be rotated about an axis that is perpendicular to said platform portion;
   means for mounting the base plate to the housing wall portion so that said hub means is concentrically disposed within said circular opening formed in the housing wall portion and the base plate and the housing wall portion are in firm air-tight sealing engagement;
   means for operatively connecting the motor to the base plate and the spindle shaft to rotate the spindle shaft when the motor is energized;
   at least one disc operatively mounted to the spindle shaft so that the disc rotates in a plane that is coaxial with and normal to the spindle shaft;
   at least one transducer mounted on a carriage within said housing for accessing data recorded in the disc; and
   actuator means mounted to the base plate at a position remote from the spindle shaft for moving said carriage and translating the transducer along the disc to selected track locations thereon.

2. The rotating disc memory storage apparatus according to claim 1, wherein said apparatus includes a spindle shaft to which the disc is operatively connected, said motor includes a stator and a rotor, with the rotor being attached directly to the spindle shaft and the stator being connected to the platform portion of the base plate.

3. The rotating disc memory storage apparatus according to claim 1 wherein the hub means for rotatably receiving the spindle shaft is integrally formed in the annular portion of the base plate.

4. The rotating disc memory storage apparatus according to claim 1, further comprising means for forming an air-tight seal between the base plate and an adjacent surface area of the housing wall portion including an annular elastomeric member shaped to engage the base plate and said surface area of the housing wall portion with relatively large areas of contact, and wherein said means for removably attaching the base plate to the housing wall portion is adapted to compress the annular member between the base plate and the adjacent housing wall portion surface area.

5. The rotating disc memory storage apparatus according to claim 1 wherein said means for mounting the base plate to the housing wall portion includes elastomeric washers and screws for connecting the base plate to the housing wall portion, the washers being received on the screws to resiliently mount the base plate upon the screws.

6. The rotating disc memory storage apparatus according to claim 1 wherein the stator of the spindle motor is mounted to bosses symmetrically disposed on the lower surface of the base plate.

7. An improved memory storage apparatus including a housing, an actuator base plate assembly mounted within the housing, the actuator base plate assembly including a carriage, at least one transducer mounted in spaced apart relationship to the carriage, and electromagnetic means for reciprocating the carriage, a spindle motor mounted to the acuatator base plate assembly, at least one disc operatively connected to the motor within the housing, said at least one disc being secured in axially-spaced parallel relationship, with the said at least one transducer being mounted to the carriage so that upon reciprocation of the carriage they said at least one transducer is moved to desired track locations on the surfaces of the discs, wherein the improvement comprises:

said housing including a casing having circular opening formed therein, a base plate, the base plate including an annular platform portion and means mounted to the periphery of said annular platform portion for receiving the actuator assembly, said at least one disc being operatively connected to a spindle shaft, boss means mounted to said platform portion for rotatably receiving the spindle shaft so that the shaft rotates about an axis that is perpendicular to and located at the center of the platform portion, and means for mounting the base plate within the housing so that said axis of rotation is centered within said housing opening, the diameter of the opening being smaller than the diameter of the platform portion to thus expose an annular area of the platform portion to an environment external of said housing.

8. The improved memory storage apparatus according to claim 7 wherein the spindle shaft is mounted to an external surface of the base plate within said opening in the housing.

9. The improved memory storage apparatus according to claim 8 wherein the stator of the motor is attached to the base plate and the rotor of the motor is operatively connected to the spindle shaft.

10. The improved memory storage apparatus according to claim 7 wherein the apparatus further includes an annular elastomeric member positioned in air-tight sealing relationship between a peripheral margin area of the base plate and an adjacent internal surface area of the housing.

11. Apparatus according to claim 1, 2, 3, 4, 5, 6, 7, 8, 9 or 10, wherein said base plate is configured and mounted to said housing in such a way that temperature changes in said base plate displace said shaft in a direction perpendicular to the direction of reciprocation of said carriage.

12. Apparatus as in claim 11 wherein the base plate is maintained at a substantially uniform temperature as a result primarily of convective heat transfer.

13. A rotating disc memory storage apparatus comprising:

an apparatus housing including a top cover, surrounding side walls and a bottom housing wall portion;

said bottom housing wall portion having an opening therein;

a planar base plate including a hub extending perpendicularly from said base plate, said base plate being resiliently mounted in said housing to said bottom housing wall portion and said hub being aligned with said bottom housing wall portion opening;

means for mounting a rotating disc spindle in said hub;

a motor having a stator and rotor;

means for fixedly mounting the motor stator adjacent said opening;

means for rotatively connecting the motor rotor to said spindle;

means to mount at least one information storage disc on said spindle in said housing;

a transducer-carrying actuator in said housing for accessing said at least one disc to read-write information on said disc; and means on said base plate for mounting said actuator at the radially periphery of said at least one disc.

14. The invention set forth in claim 13 further including a resilient pad extending between said base plate and said bottom housing wall portion, said pad having an opening concentric to the opening in said bottom housing wall portion such that said pad seals and resiliently mounts said base plate to said bottom housing wall portion and prevents ingress of contaminants into said housing.

15. The invention set forth in claim 13 wherein said means for mounting the actuator in integral with said base plate.

* * * * *